(12) United States Patent
Liikanen et al.

(10) Patent No.: US 6,606,216 B1
(45) Date of Patent: Aug. 12, 2003

(54) TRANSDUCER HEAD WITH SEPARATE DATA AND SERVO READ ELEMENTS

(75) Inventors: Bruce A. Liikanen, Berthoud, CO (US); Moris M. Dovek, San Jose, CA (US); John C. Purkett, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/305,536

(22) Filed: May 5, 1999

(51) Int. Cl.[7] ............................................. G11B 5/596
(52) U.S. Cl. .................................................. 360/77.08
(58) Field of Search .......................... 360/77.01, 77.02, 360/77.05, 77.08, 48; 369/13.17, 13.38, 13.43, 13.1, 13.22, 13.2, 13.23, 13.12

(56) References Cited

U.S. PATENT DOCUMENTS

| | | | |
|---|---|---|---|
| 3,246,307 A | 4/1966 | Stanley | 360/77.06 |
| 3,860,965 A | 1/1975 | Voegeli | 360/77.06 |
| 3,918,091 A | 11/1975 | Walraven et al. | 360/77.06 |
| 4,012,781 A | 3/1977 | Lin | 360/315 |
| 4,115,823 A | 9/1978 | Commander et al. | 360/77.02 |
| 4,377,827 A | 3/1983 | Rose | 360/78.04 |
| 4,701,815 A * | 10/1987 | Yada et al. | 360/77.06 |
| 4,757,410 A | 7/1988 | Seko et al. | 360/316 |
| 4,918,972 A * | 4/1990 | Kenny et al. | 373/1.79 |
| 5,107,385 A | 4/1992 | Kelley | 360/322 |
| 5,257,148 A | 10/1993 | Solhjell et al. | 360/77.06 |
| 5,420,736 A | 5/1995 | Heim et al. | 360/322 |
| 5,506,687 A | 4/1996 | Gillard et al. | 386/21 |
| 5,737,156 A * | 4/1998 | Bonyhard | 360/327.11 |
| 5,754,354 A | 5/1998 | Tomita et al. | 360/61 |
| 5,867,341 A * | 2/1999 | Voltz et al. | 360/77.08 |
| 5,875,064 A * | 2/1999 | Chainer et al. | 360/75 |
| 5,907,447 A * | 5/1999 | Yarmchuk et al. | 360/75 |
| 6,104,562 A * | 8/2000 | Ottesen et al. | 360/63 |
| 6,256,160 B1 * | 7/2001 | Liikanen et al. | 360/48 |

FOREIGN PATENT DOCUMENTS

GB    1 470 735    4/1977

* cited by examiner

Primary Examiner—David Hudspeth
Assistant Examiner—Mitchell Slavitt
(74) Attorney, Agent, or Firm—Tejpal S. Hansra

(57) ABSTRACT

A magnetic storage system is disclosed which has one or more rotating disks. In one embodiment, the system includes a first transducer and a second transducer operatively associated with a respective first surface or second surface. Each of the first and second surfaces has a data track with a data region and an embedded servo sector. The first transducer has a data reader which includes a first MR strip and a servo reader which includes a second MR strip. The first MR strip is electrically isolated from the second MR strip. The first transducer performs a servo reading operation of the servo sector while the second a transducer performs either a data writing operation to the data region or a data reading operation from the data region. Also disclosed is a method for reading within a magnetic storage system. The storage system includes a first magnetic surface, a data reader and a servo reader. The first magnetic surface includes a first data region and a first servo sector. The data reader is not coupled to the servo reader. Servo information is read with the servo reader so that an off-track position of the data reader can be determined. After the off-track position is known, the data reader is moved to compensate for the off-track position. Once the data reader is properly positioned, the data reader retrieves user data from the first data region of the first magnetic surface.

61 Claims, 11 Drawing Sheets

TRANSDUCER HEAD WITH SEPARATE DATA AND SERVO READ ELEMENTS

FIELD OF THE INVENTION

The invention relates generally to magnetic disk drive storage systems and, more specifically, to a method and an apparatus for using separate servo and data read elements to allow for more efficient positioning of a transducer.

BACKGROUND OF THE INVENTION

A magnetic disk drive system is a digital data storage device that stores digital information within concentric tracks on a storage disk (or platter). The storage disk is coated with a magnetic material that is capable of changing its magnetic orientation in response to an applied magnetic field. During operation of a disk drive, the disk is rotated about a central axis at a substantially constant rate. To write data to or read data from the disk, a magnetic transducer is positioned above a desired track of the disk while the disk is spinning.

Writing is performed by delivering a write signal having a variable current to a transducer while the transducer is held close to the rotating disk over the desired track. The write signal creates a variable magnetic field at a gap portion of the transducer that induces magnetic polarity transitions into the desired track. The magnetic polarity transitions are representative of the data being stored.

Reading is performed by sensing magnetic polarity transitions previously written on tracks of the rotating disk with the transducer. As the disk spins below the transducer, the magnetic polarity transitions on the track present a varying magnetic field to the transducer. The transducer converts the magnetic signal into an analog read signal which is amplified in a preamplifier, whereafter the signal is delivered to a read channel for appropriate processing. The read channel converts the analog read signal into a properly timed digital signal that, after additional processing, can be recognized by a host computer system external to the drive.

The transducer contains a read element and a write element to respectively perform the functions of writing to and reading from the disk. Some transducers contain dual-purpose elements which can both write to and read from the disk, but modern transducers separate the read element from the write element for reasons explained below.

Portions of a standard disk drive, generally designated 100, are illustrated in FIGS. 1A and 1B, where FIG. 1A is a top view of the disk drive 100 and FIG. 1B is a sectional side view thereof The disk drive comprises disks 104 that are rotated by a spin motor (not shown). The spin motor is mounted to a base plate (not shown). Data is stored on magnetic material which coats the two surfaces 108 of the disk 104. An actuator arm assembly 112 is also mounted to the base plate.

The actuator arm assembly 112 includes a transducer 116 mounted to an actuator arm 124. The actuator arm 124 rotates about a bearing assembly 128. The actuator arm assembly 112 cooperates with a voice-coil motor (VCM) 132 which moves the transducer 116 relative to the disk 104. The spin motor and voice-coil motor 132 are coupled to a number of electronic circuits mounted to a printed circuit board (not shown) which control their operation. A number of wires 136, among other things, are used to couple the transducer 116 to the read channel (not shown in FIG. 1A). These wires are routed from circuitry within the drive, across the actuator arm assembly 112 and to the transducer 116. An analog read signal and an analog write signal are transported by these wires 136. The analog read signal is amplified by a preamplifier 140 before it is further processed by other circuitry (not shown) into a digital representation of the data stored on the disk 104. The preamplifier 140 is typically located on the actuator arm assembly 112 and positioned as close to the transducer 116 as practical so that noise may be reduced. After the preamplifier 140, the amplified analog read signal is passed to other circuitry which may include a read channel chip, a microprocessor-based controller and a random access memory (RAM) device, among other things.

As shown in FIG. 1B, each of the plurality of disks 104 has two sides, with magnetic material 108 on each of those sides. Two actuator arm assemblies 112 are provided for each disk 104. To position the transducer 116, the VCM 132 moves all actuator arms 124 in unison relative to their respective disks 104. The VCM 132 makes position adjustments to the pivotally connected actuator arms 124 so that a particular transducer is centered over a data track 144 (see FIG. 1A). As is well understood in the art, movement of each actuator arm 124 can be independently optimized for imperfections in the arcuate geometry of each data track 144 on the actuator arm's corresponding magnetic surface 108.

Referring to FIG. 1A, data is stored on the disk 104 within a number of concentric data tracks 144 (or cylinders). Each data track 144 is divided into a plurality of sectors, and each sector is further divided into a data region 148 and a servo region (or servo sector) 152.

Servo sectors 152 are used to, among other things, provide transducer position information so that the transducer 116 can be accurately positioned by the actuator arm 124 over the data track 144, such that user data can be properly written onto and read from the disk 104. The data regions 148 are where non-servo related data (i.e., user data) is stored and retrieved. Such data, upon proper conditions, may be overwritten. Because servo sectors are embedded into each data track 144 on each disk 104 between adjacent data regions 148, the type of servo-scheme shown in FIG. 1A is known by those skilled in the art as an embedded servo scheme (or sectored servo scheme).

A more detailed view of a transducer, generally designated 116, used for reading and writing magnetic polarity transitions to a magnetic media (not shown) is illustrated in FIG. 2. Referring to the figure, portions of the transducer 116 which face the magnetic media are shown. The part of the transducer 116 shown in this view is commonly called the air bearing surface. The transducer 116 includes a write element 200, write gap 204, first shield 208, second shield 212, read gap 216, and magnetoresistive (MR) read element 220. Unlike some early inductive transducers, the depicted transducer 116 has separate read and write elements. Magnetoresistive (MR) strips are commonly used in read elements because they change resistance when exposed to a magnetic field, and this change in resistance is relatively easy to sense. It should be noted that the read element 220 is used for reading both servo and data regions. It is further noted that the write element 200 typically has a width 224 which is greater than a width 228 of the MR read element 220. For example, the width 224 of the write element 200 might be twice the width 228 of the read element 220. The reason for this width variance is explained below.

As part of the writing process, a variable current is used to induce magnetic flux across the write gap 204 between the write element 200 and the first shield 208. The write element 200 and first shield 208 act as poles for an electromagnet which induces magnetic flux across the write gap 204. The direction of the variable current defines the direction in which the magnetic flux will be oriented across the write gap 204. In some simple recording systems, flux polarized in one direction across the write gap 204 will record a binary "one" on the magnetic media while flux polarized in the opposite direction will record a binary "zero." In most recording systems, a change in the direction that the flux travels across the gap 204 is interpreted as a "one" while the lack of a change is interpreted as a "zero." As the magnetic material on the disk surface 108 (shown in FIG. 1A) travels under the transducer 116 in the direction shown by arrow 232, a series of digital "ones" and "zeros" can be written within the data track 144 (shown in FIG. 1A).

When reading, the magnetic polarity transitions, previously written onto the magnetic media, are coupled to the transducer 116 in order to recover the stored digital data. When a magnetic polarity transition in the magnetic media passes under the transducer 116, the read element 220 will each generate a signal in response to the changing magnetic field which corresponds to a previously recorded data bit. This signal is called an analog read signal. A preamplifier 140 (shown in FIG. 1A) is used to provide low noise amplification of the analog read signal. Conversion of the analog read signal back into a digital signal is performed within a read channel, after which it is passed to an exterior environment such as a computer. During the read process, the first and second shields 208, 212 form a read gap 216 which serves to focus the flux for a particular magnetic polarity transition onto the read element 220 by shielding the read element 220 from other sources of magnetic flux. In other words, extraneous magnetic flux is filtered away from the read element 220 by the shields 208, 212.

FIG. 3 shows a portions of a number of data tracks 144 drawn in a straight, rather than arcuate, fashion for ease of depiction. As is well-known, data tracks 144 on magnetic disks 104 (as depicted in FIG. 1A) are circular. Referring again to FIG. 3, each data track 144 has a centerline 300. To accurately write data to and read data from the data region 148 of the data track 144 while the disk travels in a direction denoted by the arrow 232, it is desirable to maintain the transducer 116 (see FIG. 1A) in a relatively fixed position with respect to a given track's centerline 300 during each of the writing and reading procedures.

With reference to FIGS. 1–3, to assist in controlling the position of the transducer 116 relative to the track centerline 300, the servo region 152 contains, among other things, servo information in the form of servo patterns comprised of two or more groups of servo bursts, as is well-known in the art. First and second servo bursts 304, 306 (commonly referred to as A and B servo bursts, respectively) are shown in FIG. 3 for each data track 144. Servo bursts 304, 306 are accurately positioned relative to the centerline 300 of each data track 144, and are typically written on the disk 104 during the manufacturing process using a servo track writer ("STW"). The STW alternatively writes a number of A bursts 304 in a concentric circle and then a number of B bursts 306 in a concentric circle until all data tracks 144 have servo information embedded therein. The concentric circle of either A or B bursts 304, 306 is defined herein as a servo track. Unlike information in the data region 148, servo bursts 304, 306 may not normally be overwritten or erased during operation of the disk drive 100.

As the transducer 116 is positioned over the data track 144, it reads the servo information contained in the servo regions 152 of the track, one servo region at a time. The servo information is used to, among other things, generate a position error signal (PES) as a function of the misalignment between the transducer 116 and the track centerline 300. The PES signal is provided as an input to a servo control loop which performs calculations and outputs a servo compensation signal which controls the VCM 132 to place the transducer 116 over a particular position relative to the track centerline 300. When a write function is desired, the dual-purpose transducer 116 reads servo information from the servo region 152, is positioned over the track centerline 300 in the manner described above, and then writes to the disk 104 when the transducer 116 is over the data region 148.

As mentioned above, the read element 220, shown in FIG. 2, reads information from both the servo region 152 and data region 148. The dual-purpose nature of the read element 220 requires transducer designers to compromise between optimizing the read element 220 for reading servo information or for reading user data, as explained more fully below.

Referring to FIG. 4, the transducer 116 and a portion of the analog read channel is illustrated in block diagram form. The transducer 116 contains a write element 200 and a dual-purpose servo/data read element 220. An analog write signal 400 is provided to the write element 200, and an analog read signal 404 is received from the read element 220. To provide low noise factor amplification, the analog read signal 404 is provided to a preamplifier 140. An amplified analog read signal 408 is sent from the preamplifier 140 to a demultiplexor 412 where a servo read signal 416 and a data read signal 420 are produced under the control of a select line 424. Typically, the preamplifier 140 is located on the actuator arm assembly 112 (see FIGS. 1A and 1B) while the demultiplexor 140 is located in the read channel. The select line 424 is provided by other circuitry within the read channel and controls the demultiplexing of the amplified read signal 408. In this way, the dual-purpose servo/data read element 220 provides both the servo read signal 416 and the data read signal 420.

Referring once again to FIGS. 1–3, the geometric relationship of data tracks 144 and transducer 116 is explained. The data region 148 has a width 312 (see FIG. 3) in the radial direction of the disk 104 generally equal to the width 224 (see FIG. 2) of the write element 200. As an artifact of the write process, erase bands 316 (see FIG. 3) are created between each data track 144. The erase bands 316 are considered wasted space since they cannot store user data. To reliably position the read element 220 over the centerline 300 and avoid the erase bands 316, one skilled in the art can appreciate the desirability of having an read element width 228 (see FIG. 2) smaller than the data region width 312. In other words, the smaller the read element width 228 with respect to the data region width 312 (see FIG. 3), the more the likely the read element 220 will be positioned over a portion of the data region 148 with a magnetic signal of sufficient amplitude to reliably read the user data.

As shown in FIG. 1A, circular data tracks 144 extend from an inner usable radius of the disk ("inner diameter" or "ID") 156 to an outer usable radius of the disk ("outer diameter" or "OD") 160. The servo regions 152 for each data track 144 are generally aligned radially, and the servo regions are generally the same size regardless of the radial positioning of the servo region 152. A servo burst width 320 (see FIG. 3) is approximately equal to the data region width 312 plus an erase band width 324. As can be appreciated, toward the distal dimensions of the disk the data regions 148 are physically longer because the servo regions 152 remain the same size as the circumference of the data track 144 grows larger.

Along a given radius of the disk there is a ratio between the total number of A and B servo bursts 304, 306 and the data tracks 144. In FIG. 3, each data track 144 requires half of the A burst and half the B burst to accurately position the transducer 116 over the track centerline 300. Accordingly, the ratio of A and B servo burst 304, 306 to data tracks 144 for this configuration is one to one.

With reference to FIG. 5, a block diagram of the read electronics for a conventional two disk (i.e., four surface) drive system is shown. Each surface 108 (see FIG. 1B) of the two disks 104 has a corresponding transducer 504, 508, 512, 516 which reads both servo and user data from that surface 108. A read element 220 (see FIG. 2) in a first transducer 504 produces a first analog read signal 520 which is amplified in a first preamplifier 536, whereupon a first amplified analog read signal 552 is produced. Similarly, a second, third and fourth preamplifiers 540, 544, 548 respectively amplify each of a second, third and fourth analog read signals 524, 528, 532 to produce corresponding second, third and fourth amplified analog read signals 556, 560, 564. In this way, the amplified read signal 552, 556, 560, 564 is produced for each disk surface 108 (see FIG. 1A).

In conventional disk drives 100 with embedded servo sectors, only one disk surface 108 is read from at a time. This means only one of the first, second, third, and fourth amplified analog read signals 552, 556, 560, 564 requires decoding to read from the single disk surface 108. This allows multiplexing 572 of the first, second, third, and fourth amplified analog read signals 552, 556, 560, 564 into a single read channel 580. Based upon the select inputs 568, the multiplexer 572 routes one of the first, second, third, and fourth amplified analog read signals 552, 556, 560, 564 to a selected analog read signal path 576. The read channel 580 takes the signal coupled to the selected analog read signal path 576 and processes the signal to produce either a digital representation of the user data or the servo information. In this way, each of the four disk surfaces 108 is read by a single read channel 580.

As those skilled in the art can appreciate, when the read element width 228 is less than the servo burst width 320, conventional position error techniques will produce PES signals with a non-linear response. The non-linear response makes it difficult to determine the centerline 300 of the data track 144. This problem in the prior art is best illustrated with examples.

FIGS. 6A–C show three different radial positions for the read element 220 with respect to servo region 152 and also show the respective A and B burst signals produced by the read element 220 at each radial position. In the depicted examples, the read element width 228 is less than the servo burst width 320. To determine off-track position, the A burst signal produced over the A servo burst pattern 304 is compared to the B burst signal produced over the B servo burst pattern 306 as the disk 104 rotates in the direction of the arrow 232. The first example in FIG. 6A depicts the read element 220 straddling the division between A and B servo bursts 304, 306 which produces the A and B burst signals shown. In the second example shown in FIG. 6B, the read element 220 is at a radial position toward the top edge of the A servo burst 304 which produces the A and B burst signals shown. The resulting A and B burst signals from the second example in FIG. 6B should be contrasted with the A and B burst signals produced in the third example shown in FIG. 6C. Although the read element 220 is at a radial position closer to the centerline 300 of the data track 144 in FIG. 6C, the A and B burst signals produced are indistinguishable from that of FIG. 6B.

As can be appreciated, the non-linearity in the A and B burst signals at different radial offsets demonstrated in FIGS. 6A–C makes off-track position determination difficult. This problem is solved by having the read element width 228 be greater than or equal to the servo burst width 320. However, enlarging the read element width 228 makes the positioning of the read element 220 while avoiding the erase bands 316 (see FIG. 3) more difficult, as explained above.

With reference to FIG. 7, a quadrature servo burst pattern is depicted with an arrow 232 defining the direction the disk rotates. To solve the non-linear response problems when the read element width 228 (see FIG. 2) is smaller than the servo burst width 320 additional servo bursts patterns are added by staggering four groups of servo bursts 304, 306, 704, 708 in a manner commonly called quadrature servo burst patterns 712. Additional third and fourth servo bursts 704, 708 (commonly called C and D servo bursts, respectively) are added to the A and B servo bursts 304, 306. In this way, the read element width 228 can be reduced to half the servo burst width 320 and still avoid nonlinear responses in the off-track detection. There is a ratio between the total number of A, B, C, and D servo bursts 304, 306, 704, 708 along a given radius and data tracks 144 of two to one for quadrature servo burst configurations. However, while adding more servo bursts 304, 306, 704, 708 per data track 144 may allow for linear off-track position determinations and more accurate read operations, the writing of the quadrature servo patterns 712 increases the drive production time and equipment costs needed for additional servo track writers while decreasing manufacturing throughput. Additionally, consuming space on the surface 108 of the magnetic disk 104 with additional servo bursts leaves less space available for user data.

Other conventional systems have attempted to solve the nonlinear off-track position problem by using the write element to read servo bursts which allows dedication of the read element for reading user data. In other words, the write element serves a dual role as a data writer and a servo reader. Since the read element is dedicated to the reading of user data, the width of the read element can be made optimally small. Unfortunately, conventional write elements do not efficiently perform read functions which makes this solution impractical.

As noted in the above discussion, the width of the write element generally defines the width of the data track 144, and the width 320 (see FIG. 3) of the servo bursts in systems, which only use the A and B bursts 304, 306, is generally equal to the width of the data track 144 plus the width 324 of the erase band 316. As can be appreciated, the dual purpose data writer and servo reader will experience a non-linear response to the servo bursts since the width 224 of the write element is necessarily smaller than the width 320 of the servo burst.

With reference to FIG. 8, the use of a center-tapped reader 802 has been suggested to bifurcate a single MR strip 818 into a user data read element and a servo read element. A first conductor 806 supplies a first current 822 to the MR strip 818 and a third conductor 814 supplies a second current 826 to the MR strip 818, whereupon a second conductor 810 returns a third current 834. The third current 834 returns a sum of the first and second currents 822, 826 and is common to the bias path of the data read element and the servo read element. It should be noted that the bias currents in the data read element and servo read element necessarily flow in opposite directions.

Center-tapped read elements suffer from poor servo read sensitivity since the placement of the second conductor 810 on the MR read element 818 creates a dead spot. As can be appreciated by those skilled in the art, a metallic conductor 810 in a central portion of the MR read element 818 serves to make the read element insensitive to the magnetic signal stored on the data track 144. In other words, the affected portion of the MR element 818 is not sensitive to magnetic fields incident upon the dead spot.

Center-tapped MR read elements are also undesirable because proper biasing of the bifurcated reader 802 is difficult. As noted above, the first and second currents 822, 826 flow in opposite directions because of the common center conductor 810. Those skilled in the art can appreciate that magnetic biasing is aligned with the current flow such that magnetic biasing of each half of the MR strip 818 should also be in opposite directions. However, it is difficult to bias permanent magnets, which provide the magnetic biasing, in opposite directions during manufacture. Accordingly, there is a need to provide separate data and servo read elements which do not experience dead spots in a configuration which allows for proper magnetic biasing.

In summary, it would be desirable to develop a transducer positioning system which: (1) optimizes the transducer for reading user data; (2) also optimizes the transducer for reading servo information while minimizing the number of servo bursts; and, (3) avoids the deficiencies of center-tapped MR read elements, including their dead spots and biasing problems.

SUMMARY OF THE INVENTION

It is an object of the present invention to develop a transducer positioning system which: (1) optimizes the transducer for reading user data; (2) also optimizes the transducer for reading servo information while minimizing the number of servo bursts; and, (3) avoids the deficiencies of center-tapped MR read elements, including their dead spots and biasing problems.

A magnetic storage system is disclosed which has one or more rotating disks. In one embodiment, the system includes a first transducer and a second transducer operatively associated with a respective first surface or second surface. Each of the first and second surfaces has a data track with a data region and an embedded servo sector. The first transducer has a data reader which includes a first MR strip and a servo reader which includes a second MR strip. The first MR strip is electrically isolated from the second MR strip. The first transducer performs a servo reading operation of the servo sector while the second transducer performs either: (1) a data writing operation to the data region, or (2) a data reading operation from the data region.

Also disclosed is a method for reading within a magnetic storage system. The storage system includes a first magnetic surface, a data reader and a servo reader. The first magnetic surface includes a first data region and a first servo sector. The data reader is not coupled to the servo reader. Servo information is read with the servo reader so that an off-track position of the data reader can be determined. After the off-track position is known, the data reader is moved to compensate for the off-track position. Once the data reader is properly positioned, the data reader retrieves user data from the first data region of the first magnetic surface.

Other objects, features and advantages of the invention will be apparent from the following specification taken in conjunction with the following drawings.

DETAILED DESCRIPTION

Figure 1A:
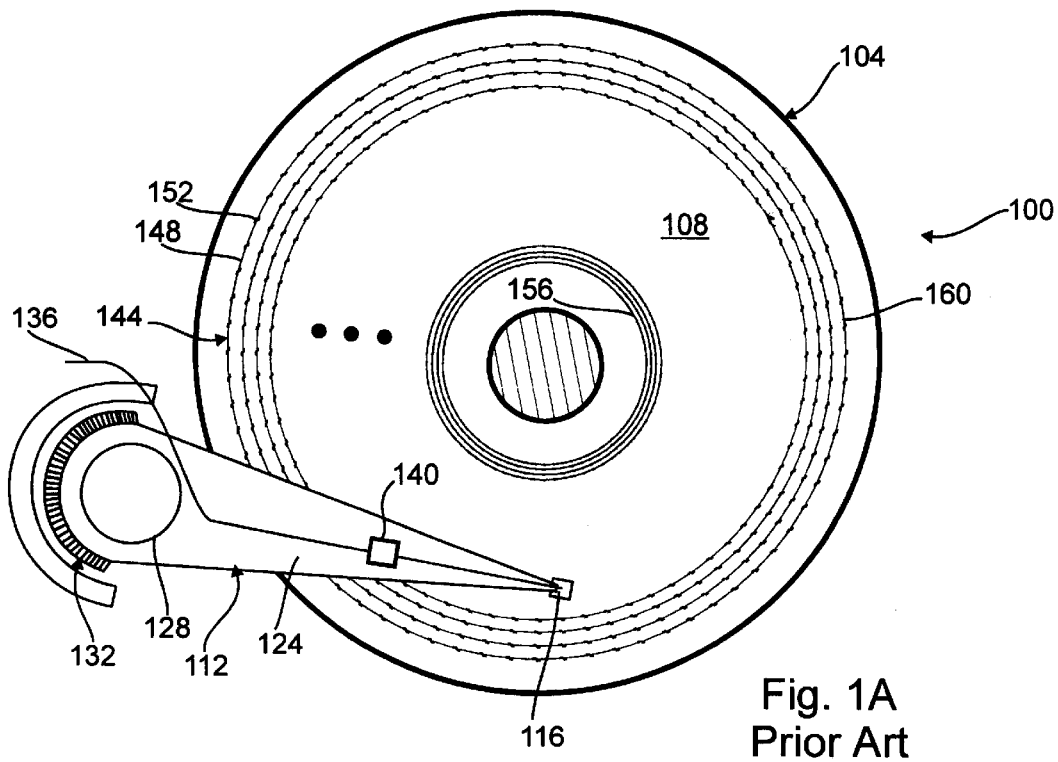
FIG. 1A is a diagrammatic representation of a top view of portions of a conventional magnetic disk drive system where some of the many tracks on the surface of the disk are accentuated.

While this invention is susceptible of embodiments in many different forms, there is shown in the drawings and will herein be described in detail, a number of embodiments of the invention with the understanding that the present disclosure is to be considered as an exemplification of the principles of the invention and is not intended to limit the broad aspects of the invention to the embodiments illustrated.

As will be described in detail below, having a servo reader separate from an user data reader allows optimizing of each for their respective tasks. The servo reader can be made optimally wide, while the user data reader can be made optimally narrow. Additionally, the separation of the readers allows avoiding the dead spots and biasing problems found in the conventional center-tapped and dual-purpose readers.

Figure 9:
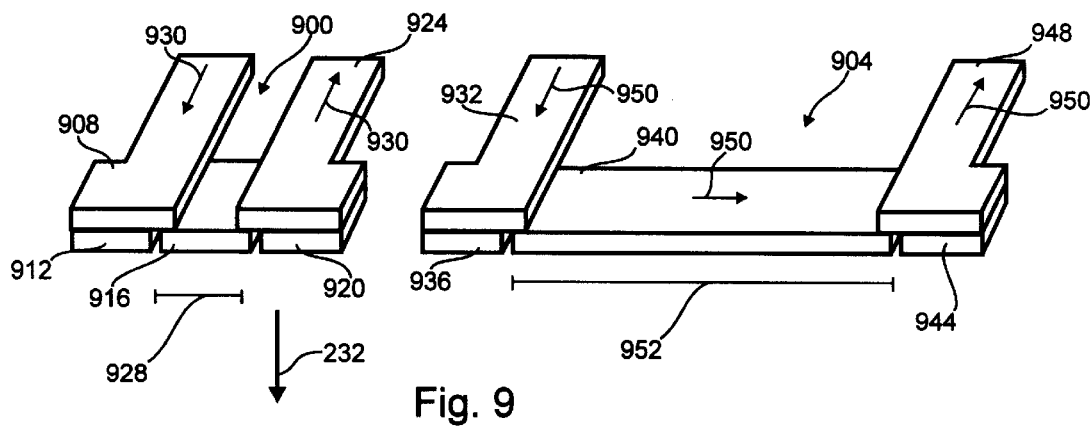
FIG. 9 is a diagrammatic representation of a perspective view showing the servo and data reader portions of an embodiment of the transducer of the present invention.

Referring first to FIG. 9, a perspective view of a data reader 900 and servo reader 904 is depicted. The data reader 900 and servo reader 904 are preferably arranged side-by-side so that additional manufacturing steps are not necessary to create both readers 900, 904, as will be described more fully below. The magnetic media travels beneath the servo and data readers 900, 904 in the direction shown by the arrow 232. However, alternative embodiments may have the servo and data readers 900, 904 arranged in other configurations such as in-line with the direction of the magnetic media denoted by the arrow 232, for example.

The data reader 900 is positioned over the data region 148 (see FIG. 3) of the data track 144 in order to read the user data stored magnetically on the disk surface 104. Included in the data reader 900 is a first conductor 908, a first permanent magnet 912, a first magnetoresistive (MR) strip 916, a second permanent magnet 920, and a second conductor 924. As is well known in the art, MR strips change their resistance when exposed to a magnetic field. To take advantage of the magnetoresistive effect, a constant first bias current 930 (the direction represented by the arrow) is supplied to the first conductor 908, flows through the first MR strip 916 and returns from the second conductor 924. In accordance with Ohm's Law (V=I×R), the voltage across the first MR strip 916 will vary in proportion to the resistance change in the MR strip 916.

The first and second permanent magnets 912, 920 are magnetically polarized in the same direction during manufacture so that they set a permanent bias. The resistance response of a MR strip when exposed to the permanent bias has linear and non-linear portions. As those skilled in the art can appreciate, a linear response is preferred over a non-linear response. To achieve the linear response based upon a preselected bias current, the MR strip is preferably biased into the linear region with a soft adjacent layer (SAL), spin valve (i.e., giant MR) or exchange bias layer. These techniques magnetically bias the MR strip into a linear portion of the resistance response.

The first MR strip 916 has a width 928 which is optimized for reading the data region 148 (see FIG. 3) of the data track 144. The first MR strip width 928 is smaller than the width of a data track 312 so that it is more likely the MR strip 916 will be positioned over the data track 144 while reading therefrom. As those skilled in the art can appreciate, it is desirous to limit the magnetic fields incident on the first MR strip 916 to the field produced from the data region 148 of the data track 144. To that end, first and second permanent magnets 912, 920 are positioned on each side of the first MR strip 916 to "pin down" the strip 916 to restrict sensitivity to the defined trackwidth. In this way, the magnetic noise from other tracks is reduced and/or eliminated so that the resistance of first MR strip 916 is only affected by the desired data track 144.

Figure 3:
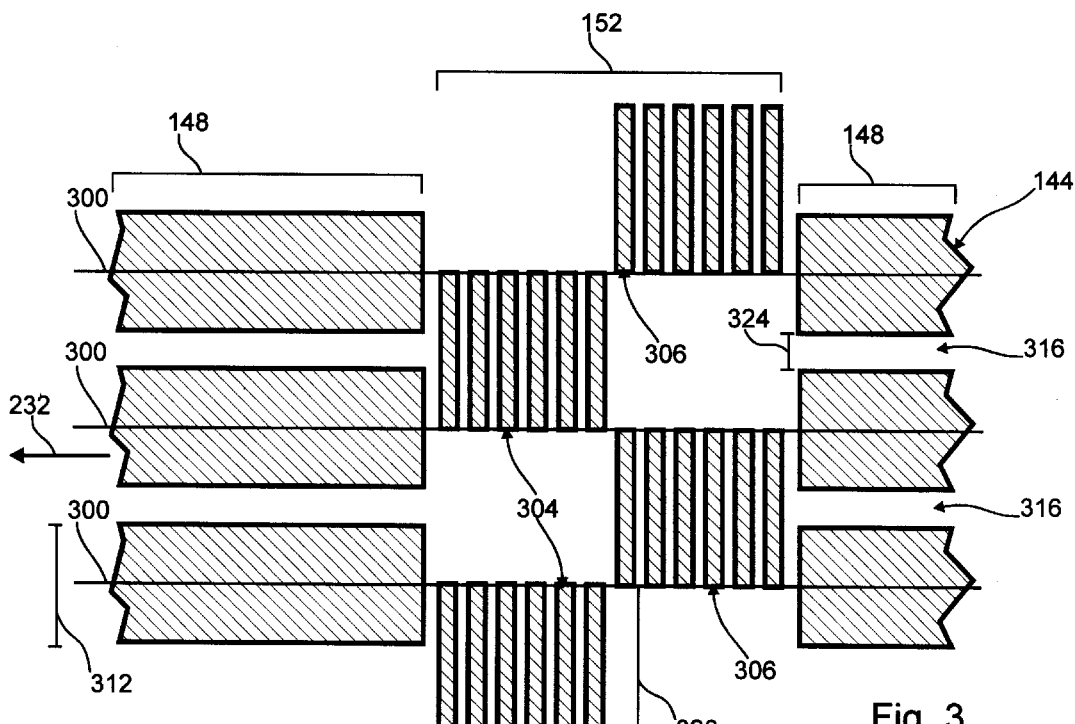
FIG. 3 is a diagram illustrating a conventional section of a surface of a magnetic disk, shown as having straight, rather than curved, data tracks for ease of depiction.
Figure 7:
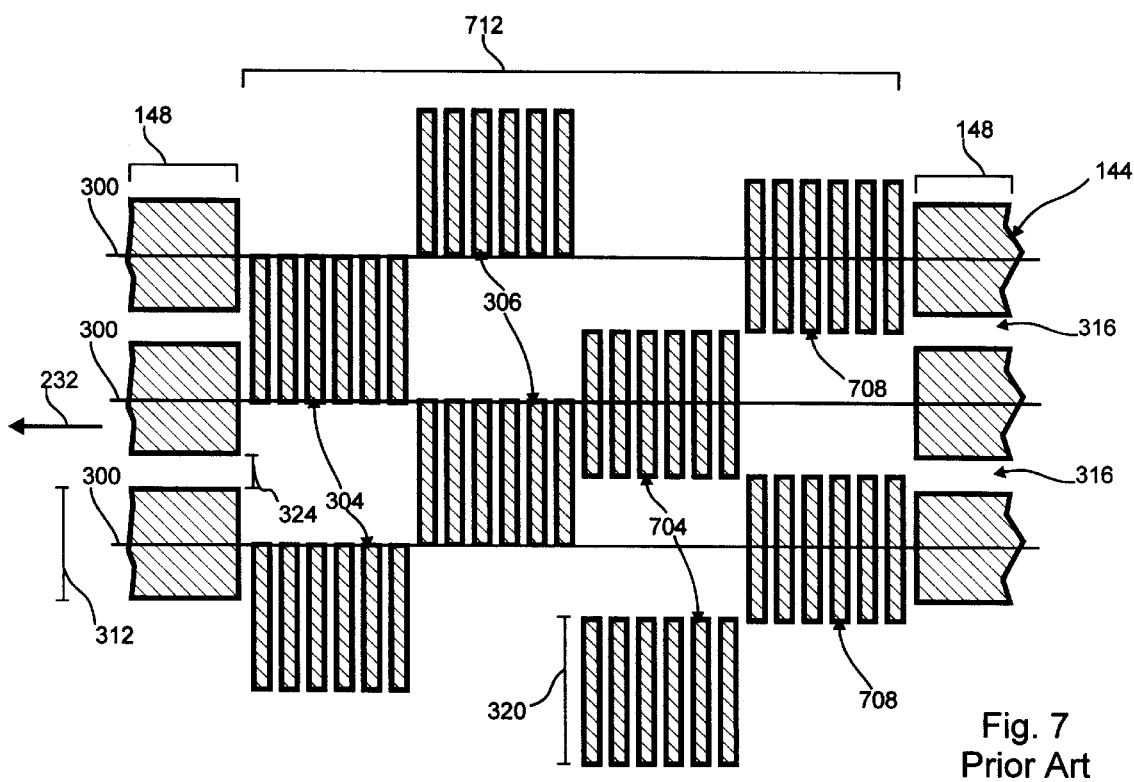
FIG. 7 is a diagram illustrating a conventional section of a surface of a magnetic disk with a quadrature servo sector pattern, shown as having straight, rather than curved, data tracks for ease of depiction.

The servo reader 904 is optimized to read servo sectors 152 (see FIG. 3). Included in the servo reader 904 is a third conductor 932, a third permanent magnet 936, a second MR strip (or data read element) 940, a fourth permanent magnet 944, and a fourth conductor 948. The second MR strip 940 has a width 952 which is sized based upon a width 320 (see FIG. 3) of servo bursts 304, 306. In a servo sector system with two servo bursts 304, 306, the second MR strip width 952 is typically sized to have a width just greater than the servo burst width 320, while in a quadrature servo sector system (see FIG. 7) the second MR strip width 952 is optimally sized to have a width just greater than half the servo burst width 320. As is understood by those skilled in the art, proper sizing of the second MR strip width 952 with respect to the servo burst width 320 avoids non-linear off-track PES signal response.

To operate effectively, the second MR strip must be electrically and magnetically biased. A constant second bias current 950 (the direction represented by an arrow) flows into the third conductor 932, through the second MR strip (or servo read element) 940 and out the fourth conductor 948. This second bias current 950 creates a voltage drop across the second MR strip 940 as the resistance therein changes as a result of changes in the incident magnetic field. The third and fourth permanent magnets 936, 944 serve to "pin-down" or restrict the sensitivity of the MR strip 940 to the defined track width.

The side-by-side configuration of the separate data and servo readers 900, 904 makes manufacture of the transducer simpler. Modem lithography techniques build the transducer in layers. Since each layer has the same composition and similar structures, those skilled in the art can appreciate that no additional masking or deposition steps are required to produce two side-by-side readers 900, 904.

Manufacturing techniques magnetically polarize the first, second, third, and fourth permanent magnets 912, 920, 936, 944 in a single step. This is performed by subjecting the first through fourth magnets 912, 920, 936, 944 to a large magnetic field so that they are polarized therefrom. Unfortunately, conventional techniques do not allow the first through fourth permanent magnets 912, 920, 936, 944 to be selectively polarized in different directions. As a result of the uniform polarization of this embodiment, the bias current must flow through each of the first and second MR strips 916, 940 in the same direction to properly achieve the magnetic and electric biasing.

Figure 8:
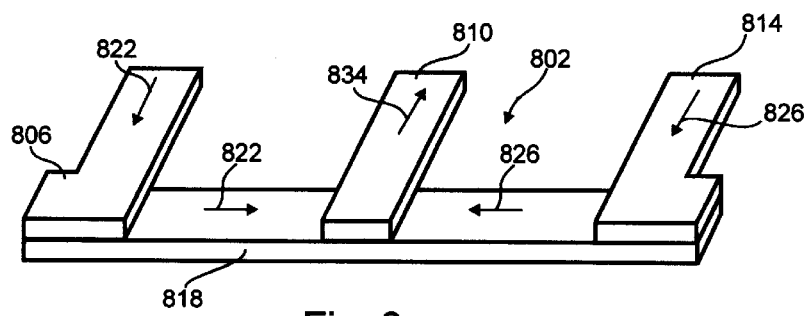
FIG. 8 is a diagrammatic representation of a perspective view showing a conventional center-tapped data reader.

The servo reader 904 is separated from the data reader 900 to provide better biasing without dead spots associated with systems which teach a single center-tapped MR strip 818, as shown in FIG. 8. As can be appreciated by those skilled in the art, the use of a single MR strip 818 with first and third conductors 806, 814 attached at the ends and a second conductor 810 connected to a point therebetween will create a dead spot because the second conductor 810 causes the current to avoid a portion of the MR strip 818. Without current in that portion of the MR strip 818, there is no sensitivity to changes in the incident magnetic field. Additionally, since the first, second, third, and fourth permanent magnets 912, 920, 936, 944 are magnetically biased in the same direction during manufacture, the first and second bias currents 930, 950 in the first and second MR strips 916, 940 also flow in the same direction. Unfortunately, the center tapped read elements 802 require a first and second bias currents 822, 826 to flow in opposite directions through each half of the bifurcated MR strip 818 because of the common center conductor 810. As explained above, the current flow in opposite directions 822, 826 makes magnetic biasing difficult because any permanent magnets should also be magnetically biased in opposite directions, although conventional manufacturing techniques generally require biasing the permanent magnets in a single direction.

Figure 10:
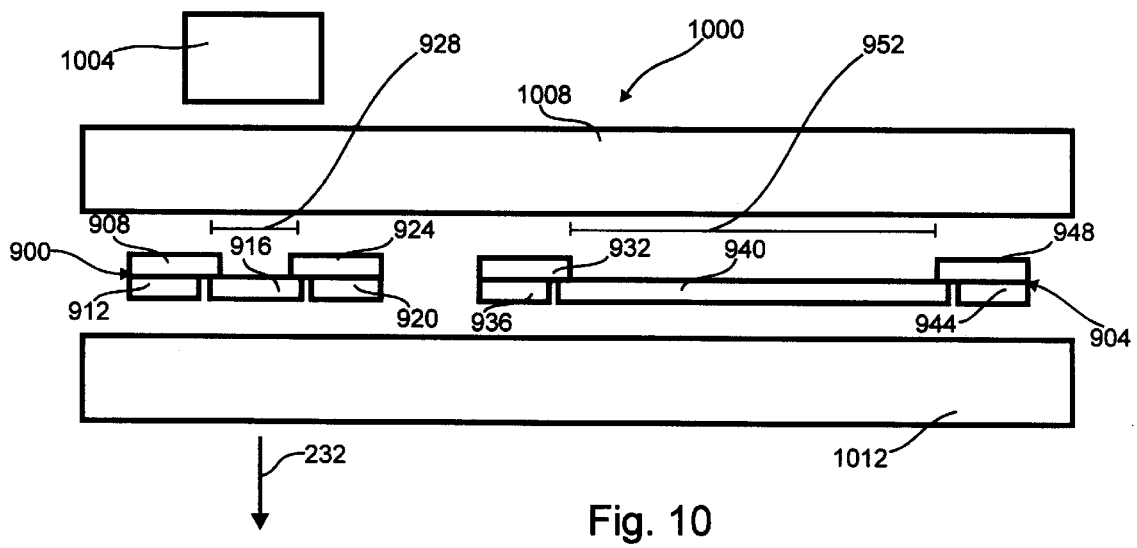
FIG. 10 is a diagrammatic representation of an air-bearing view of the transducer of FIG. 9, wherein the illustrated portion of the transducer normally faces the magnetic disk.

With reference to FIG. 10, a detailed air-bearing view of a transducer, generally designated 1000, with separate user data and servo read elements 900, 904 is illustrated. Included in the transducer 1000 are the data reader 900, the servo reader 904, a data writer 1004, a first shield 1008, and a second shield 1012. To write information to the disk surface 108 (see FIG. 1A), a magnetic field is induced between the data writer 1004 and the first shield 1008. Magnetic material on the disk surface 108 is magnetically polarized as a result of this magnetic field. In this way, data is stored in the polarized magnetic material.

Figure 11:
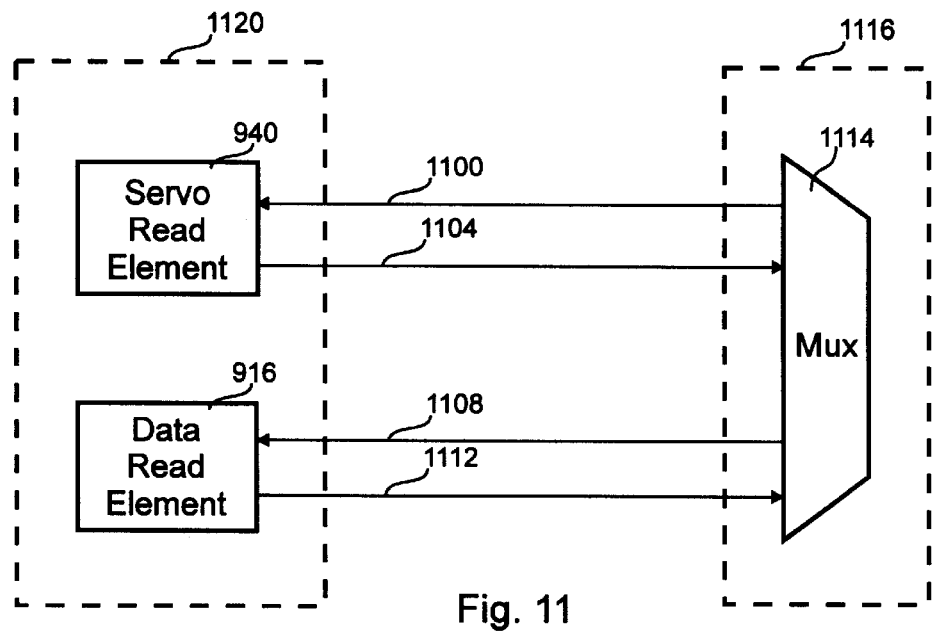
FIG. 11 is a block diagram of an interconnection between the read elements and a portion of an analog read channel which utilizes four wires.

The embodiment in FIGS. 9 and 10 has a first and a second conductor 908, 924 for the data read element 916, and a third and fourth conductor 932, 948 for the servo read element 940 so that there are a total of four conductors. Referring to FIG. 11, the four conductors 908, 924, 932, 948 would have four wires running from a portion of the transducer 1120 to a portion of the read channel 1116. The servo read element 940 is supplied a first signal 1100 and returns a second signal 1104 and the data read element 916 is supplied a third signal 1108 and returns a fourth signal 1112. It should be noted however, that the portion of the transducer 1120 never reads both servo information and user data at the same time.

Figure 12:
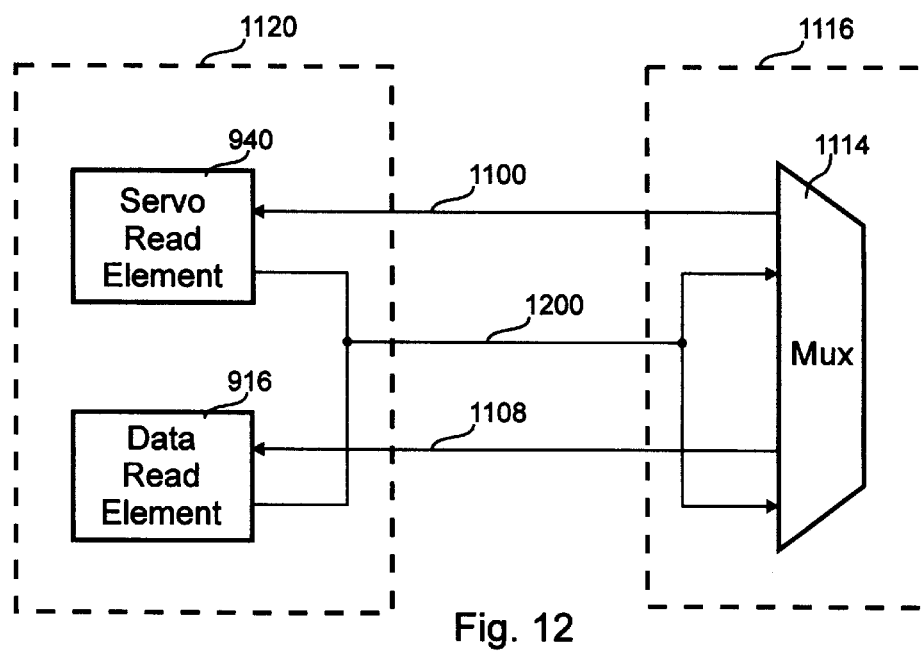
FIG. 12 is a block diagram of an interconnection between the read elements and a portion of an analog read channel which utilizes three wires.

Referring to FIG. 12, a block diagram of an embodiment which reduces the number of wires between the portion of the transducer 1120 and the portion of the read channel 1116 from four to three. To reduce the number of wires running from the portion of the transducer 1120, one of the conductors from each read element 916, 940 is connected together to reduce the number of wires to three, so that a fifth wire 1200 serves the function of the second and fourth wires 1104, 1112 (see FIG. 11). Since the transducer portion 1120 never reads both user data and servo information at the same time, the three conductors can be switched by the multiplexer 1114 to enable either the data read element 916 or servo read element 940 at the appropriate times.

Figure 4:
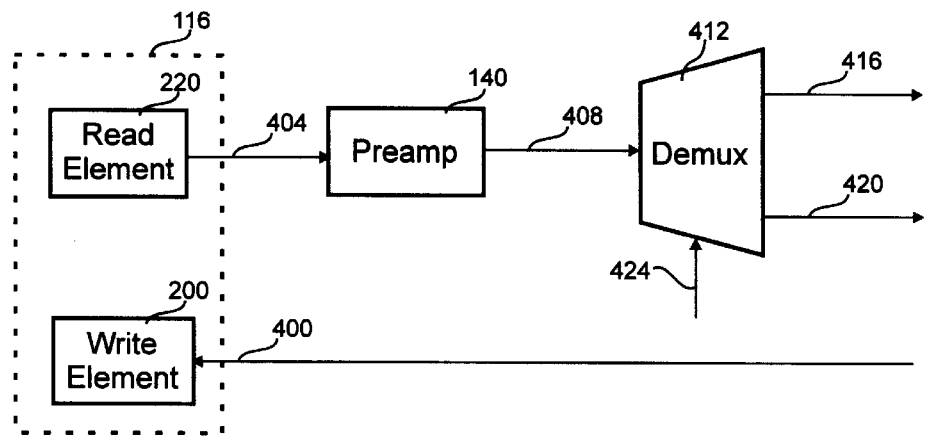
FIG. 4 is a block diagram of a portion of a conventional analog read channel which is interfaced to a transducer.
Figure 5:
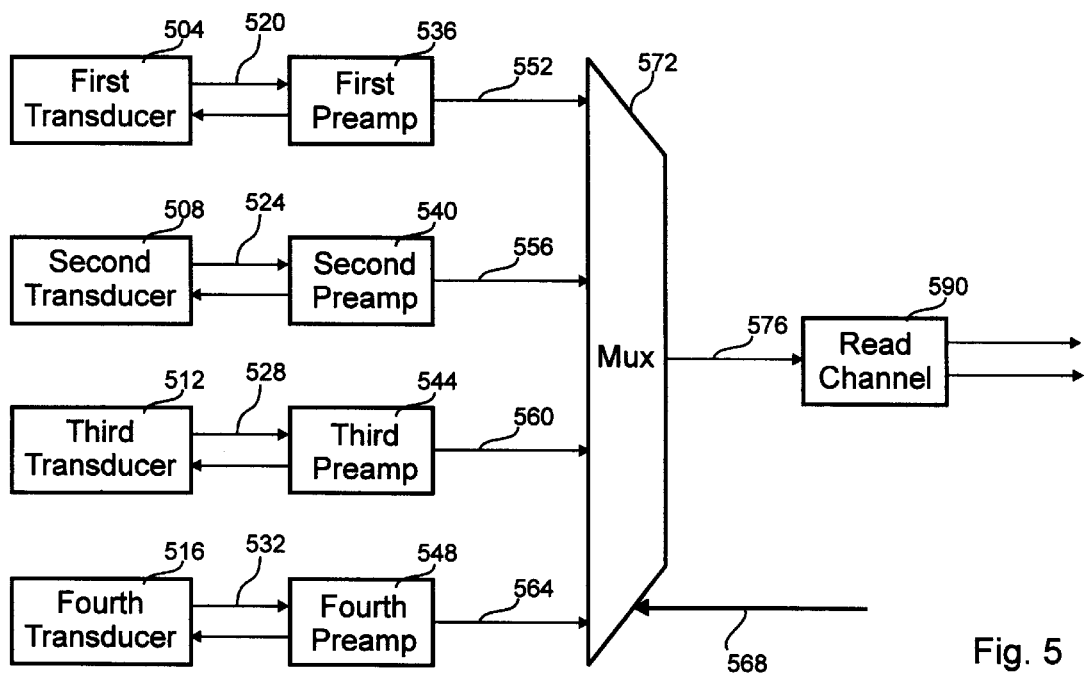
FIG. 5 is a block diagram of the read electronics for a conventional four transducer disk drive.
Figure 6A:
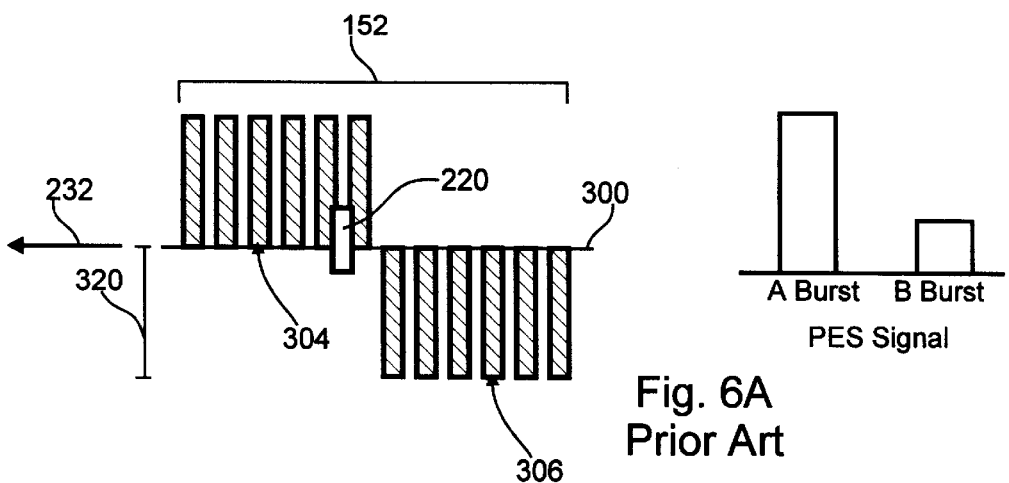
FIG. 6A is a diagram and bar graph which shows the conventional relationship between read element position and PES signal output from the shown read element for a position near track centerline.
Figure 6B:
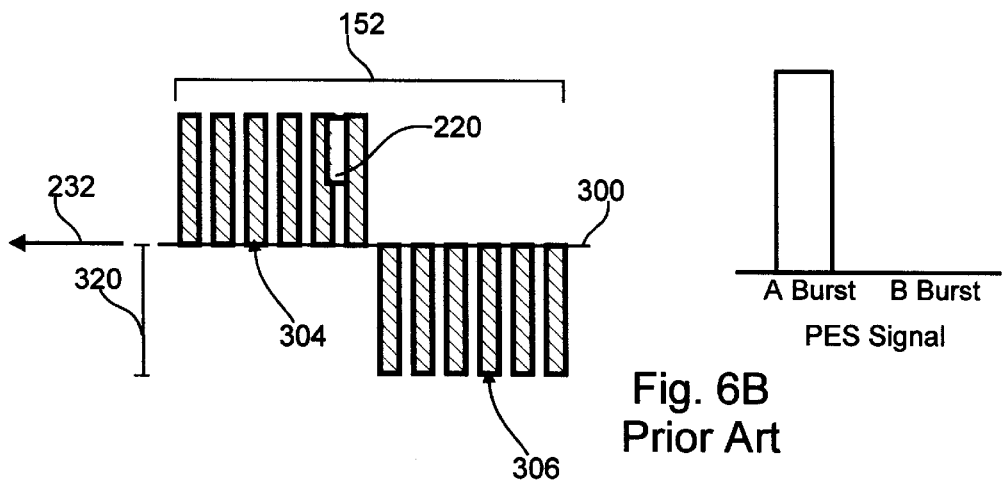
FIG. 6B is a diagram and bar graph which shows the conventional relationship between read element position and PES signal output from the shown read element for a position far above track centerline.
Figure 6C:
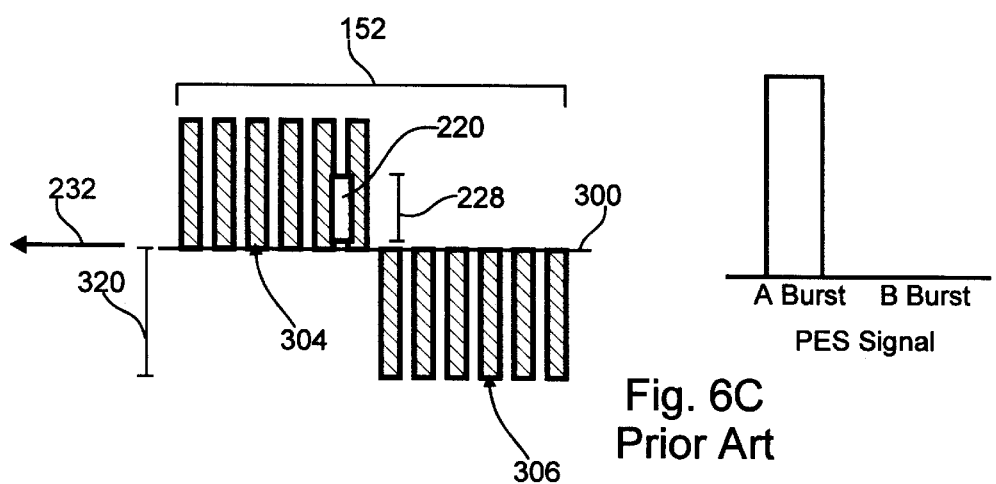
FIG. 6C is a diagram and bar graph which shows the conventional relationship between read element position and PES signal output from the shown read element for a position above track centerline.
Figure 13:
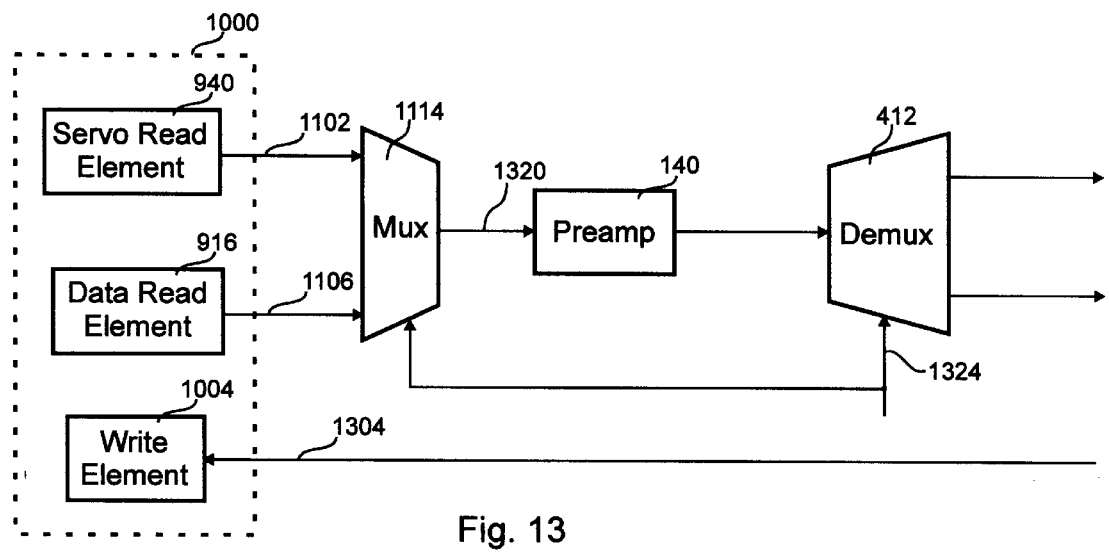
FIG. 13 is a block diagram of a portion of an analog read channel which is interfaced to a transducer with separate data and servo readers.

Referring to FIG. 13, an embodiment of the transducer 1000 and a portion of the analog read channel is illustrated in block diagram form. The transducer 1000 contains the data write element 1004, the data read element 916 and the servo read element 940. An analog write signal 1304 is provided to the data writer 1004. In contrast, a data read signal 1102 and a servo read signal 1106 are received from the transducer 1000. The data read signal 1102 and servo read signal 1106 are combined into a single read signal 1320 by a multiplexer 1114 under the control of a select line 1324. When the transducer 1000 is positioned over the data region 148 (see FIG. 3), the data read signal 1106 is selected. However, while over the servo region 152, the servo read signal 1102 is selected. In this way, the servo and data read signals 1102, 1106 can are multiplexed 1114 so that a conventional preamplifier 140 and demultiplexer 412 (see FIG. 4) can be used. By comparing FIGS. 4 and 13 one can appreciate only an additional multiplexer 1114 is needed in FIG. 13 to interface the transducer 1000 with a conventional preamplifier 140 and demultiplexer 412. The use of a conventional preamplifier 140 and demultiplexer 412 eases integration of the separate read elements 916, 940 into conventional read channels.

Figure 1B:
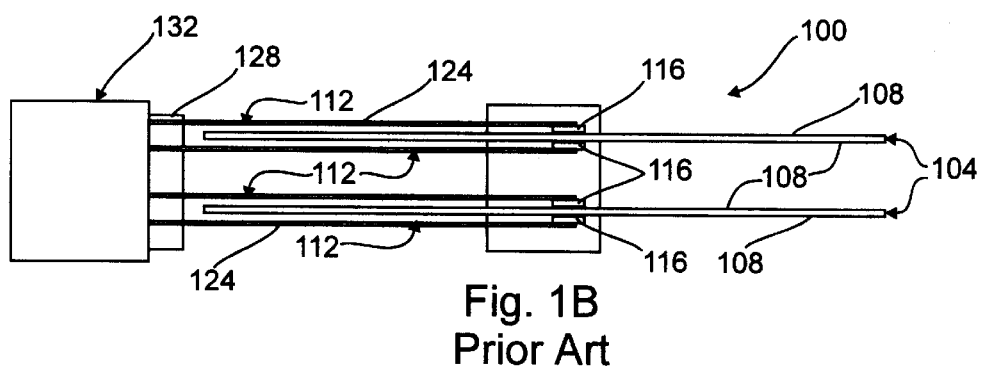
FIG. 1B is a diagrammatic representation of a side view of the drive in FIG. 1A showing two disks, each of the disks having two surfaces and an actuator arm corresponding to each disk surface.
Figure 2:
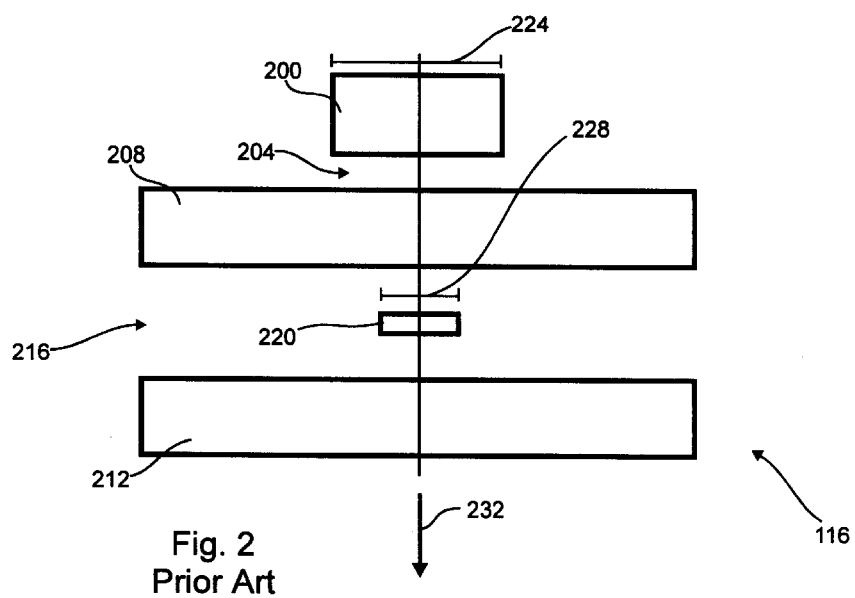
FIG. 2 is a diagrammatic representation of an air-bearing view of a conventional transducer which has separate read and write elements, wherein the illustrated portion of the transducer faces the magnetic disk.
Figure 14:
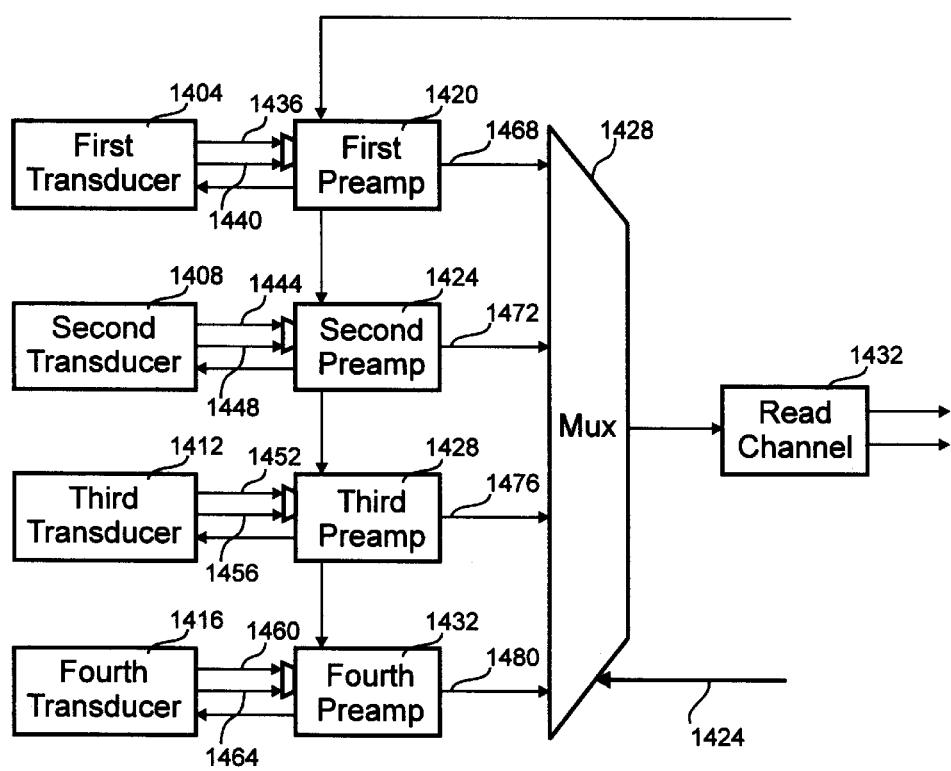
FIG. 14 is a block diagram of the read electronics for a four transducer disk drive which has separate data and servo readers for each transducer.

With reference to FIG. 14, a block diagram of an embodiment of the read electronics for a two disk (i.e., four surface) drive system 100 (see FIG. 1B) is shown. Each surface 108 of the two disks 104 has a corresponding first, second, third, and fourth transducer 1404, 1408, 1412, 1416 which each contain separate data and servo read elements 916, 940 (see FIG. 9) to respectively read user data and servo information from the respective disk surface 108. The first transducer 1404 produces servo and data read signals 1436, 1440 which are multiplexed together and amplified in a first preamplifier 1420 to produce a combined first read signal 1468. If chosen by the select lines 1424 of a multiplexer 1428, the combined first read signal 1468 is further multiplexed and passed to a read channel 1432. The read channel 1432 processes and demultiplexes the user data and servo information for the selected transducer. In the same way, each of the second, third or fourth servo read signals 1444, 1452, 1460 and second, third or fourth data read signals 1448, 1456, 1464 are respectively multiplexed and amplified in their second, third or fourth preamplifiers 1424, 1428, 1432, whereupon the selected combined second, third or fourth read signal 1472, 1476, 1480 passes through the multiplexer 1428 and is processed by the read channel 1432.

Figure 15:
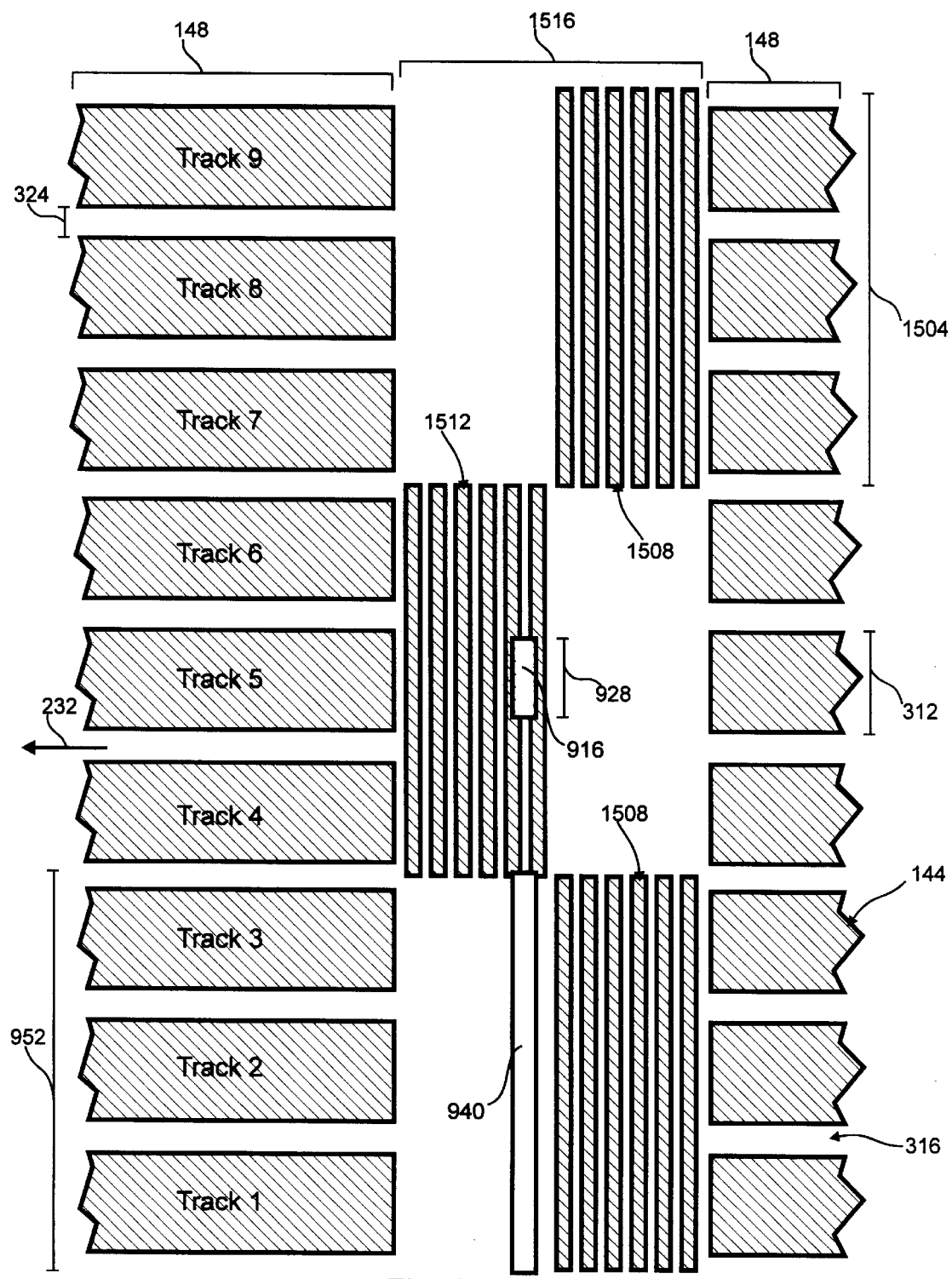
FIG. 15 is a diagram illustrating a section of a disk surface with wide servo bursts and narrow data tracks, shown as having straight, rather than curved, data tracks for ease of depiction.

A portion of a disk surface 108 (see FIG. 1A) is illustrated in FIG. 15 which shows an embodiment of the servo sectoring scheme. Although only nine data tracks 144 are shown to simplify the drawing, those skilled in the art know a disk surface 108 has many more data tracks 144. The first MR strip 916 and second MR strip 940 of the transducer 1000 are superimposed upon the disk surface 108 to generally indicate relative dimensioning. As can be seen, the first MR strip 916 has a width 928 which is less than a width 312 of the data region 148. The second MR strip 940 has a width 952 which is just greater than a width 1504 of either servo burst 1508, 1512 (i.e., A burst or B burst).

Positioning the first MR strip 916 relative to the data track 144 requires different algorithms than conventional systems. In conventional two servo burst systems (see FIG. 3), the servo burst width 320 is generally equal to the data track width 312 plus an erase band width 324. However, in the depicted embodiment, the servo burst width 1504 is greater than or equal to three data track widths 312 and three erase band widths 324. The first MR strip 916 is radially offset from the second MR strip 940 by approximately one track width 312 plus two erase band widths 324. To position the first MR strip 916 over the desired data track, a predetermined ratio between the A burst signal and B burst signal in the position error signal (PES) is needed. For example, positioning over track 4 would require the ratio between the A burst signal and B burst signal of two to one while track 5 would require three to zero and track 6 would require one to two. Modifying the PES algorithms may require new firmware in the drive and/or other modifications. It should be noted however, other embodiments could use both the data and servo readers 900, 904 in combination with appropriate off-track algorithms to position the transducer 1000.

The embodiment in FIG. 15 has a ratio of total A and B servo bursts 1508, 1512 to data tracks 144 along a given radius of one to three. As can be appreciated, having less servo bursts is desirable because laying down less servo bursts during manufacturing reduces the time needed for the servo track writer ("STW") to format the disk surface 108 (see FIG. 1B). Having less servo bursts also reduces the equipment needed to format the drives in a timely manner during manufacture. Although it is recognized that conventional STW may not be capable of writing the wide servo bursts 1508, 1512, a conventional STW could write each wide servo burst 1508, 1512 as a series of conventional servo bursts 304, 306 (see FIG. 3) which are "stitched"

together to form a contiguous wide servo burst 1508, 1512 as will be understood by those skilled in the art.

Other embodiments of the invention could use separate data and servo readers 900, 904 and have a ratio of the total number of servo bursts 1508, 1512 to data tracks 144 along a given radius of one to one or less. For example, a quadrature servo sectoring system which has a ratio of two to one. Under these circumstances, the first MR strip 916 would still be not as wide as the second MR strip 940 so that each reader 900, 904 could be optimized for its respective task. In this case, more traditional PES algorithms, known to those skilled in the art, could be used to position the transducer 1000 over the desired data track 144.

Figure 16:
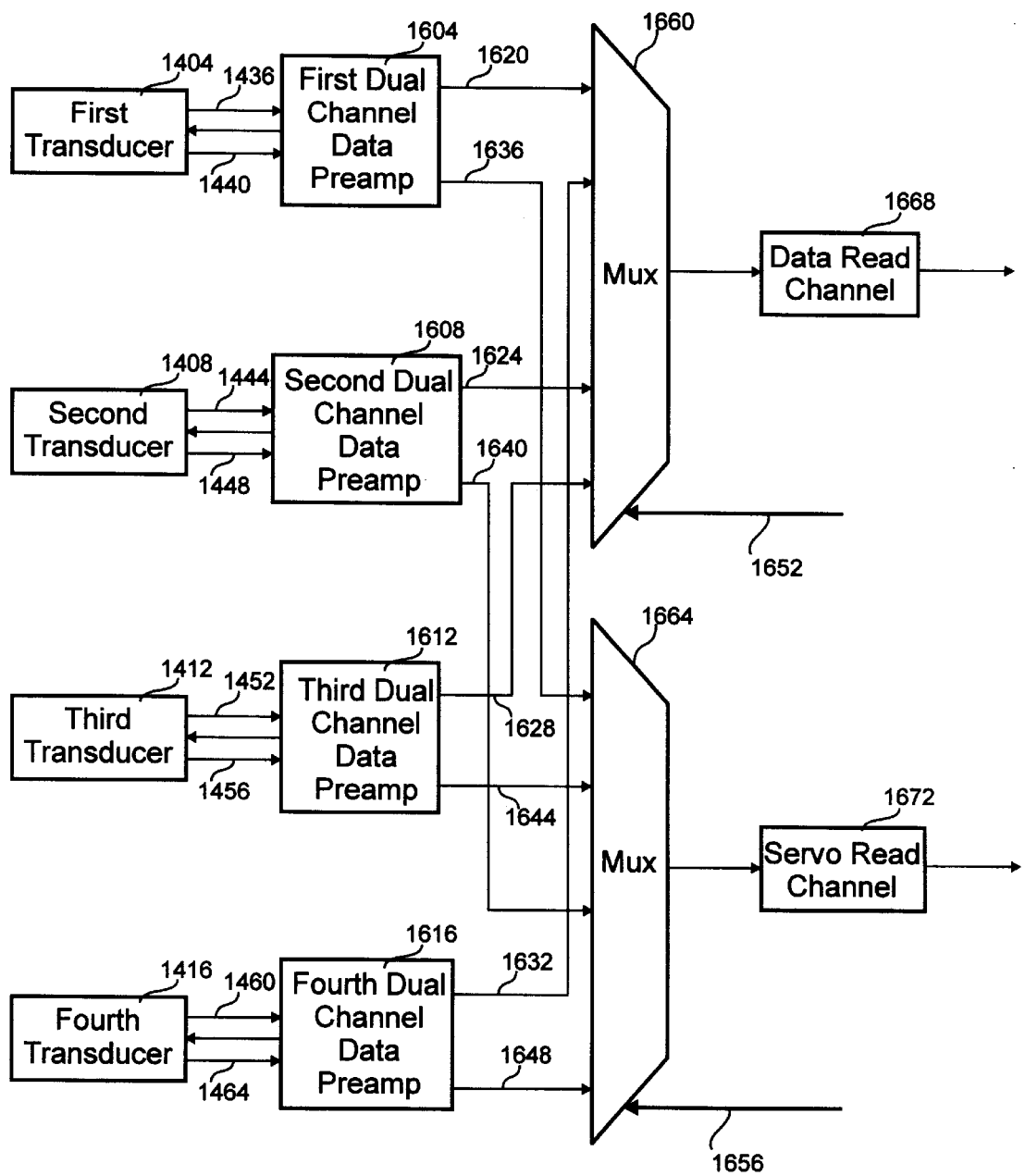
FIG. 16 is a block diagram of the read electronics for a four transducer disk drive which can simultaneously process both user data and servo information.
Figure 17:
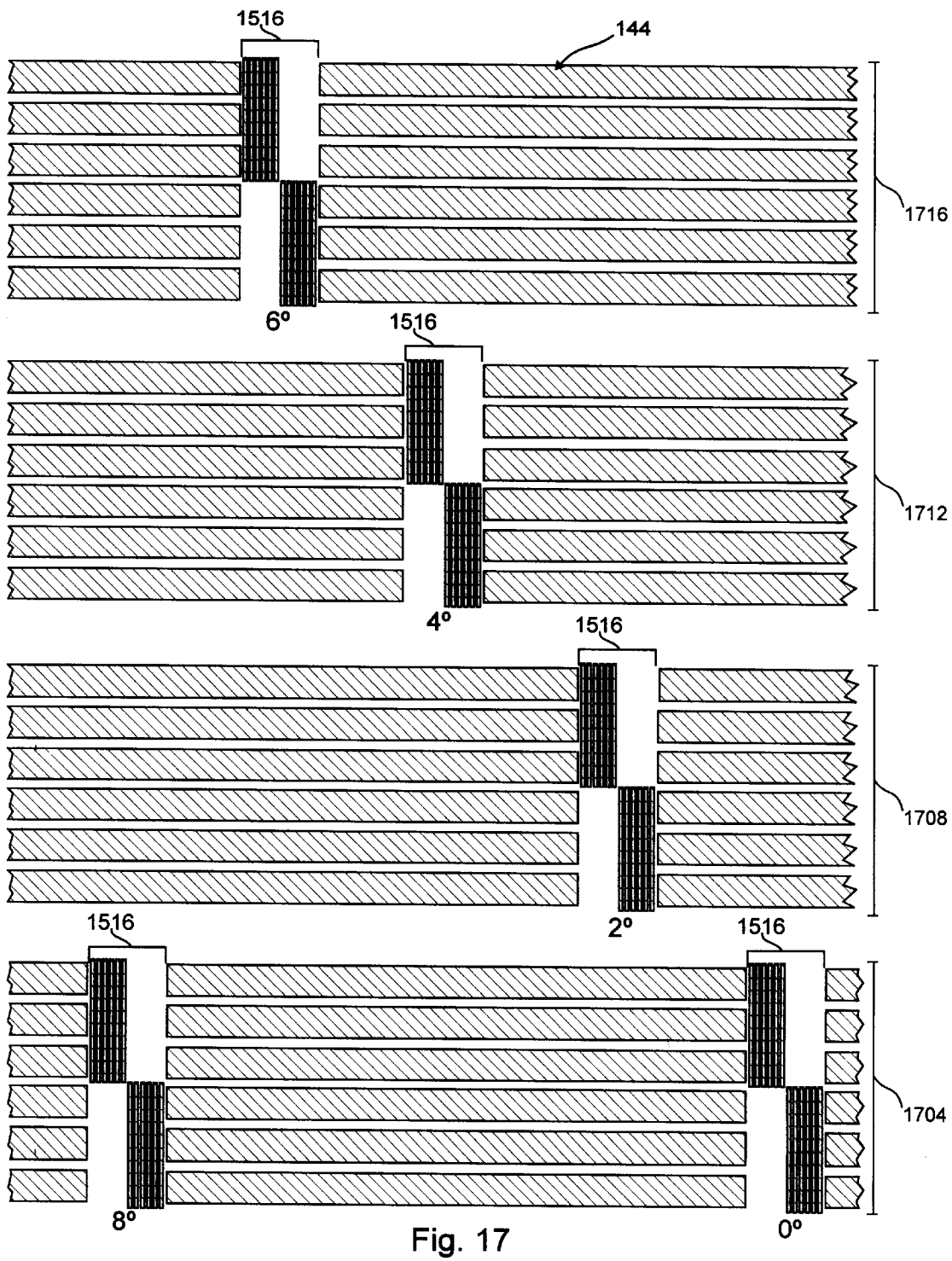
FIG. 17 is a diagram illustrating a portion of four separate disk surfaces which have staggered servo sectors.

With reference to FIGS. 16 and 17, the circuitry which processes an analog read signal produced by the data and servo readers 900, 904 is further optimized by separating the data read channel from the servo read channel. The separate servo and data read channels allow for processing user data and servo information at the same time which allows for circumferentially staggering the servo sectors on each disk surface. For example, if the first disk surface has servo sectors placed radially every eight degrees (i.e., 0°, 8°, 16° . . . 352°) the second surface has servo sectors offset two degrees (i.e., 2°, 10°, 18° . . . 354°) from the first surface. By staggering the servo sectors in this way, the flying-blind time is reduced since radial position of the transducers is corrected more often which allows for improved shock tolerance and/or reduction of the number of servo sectors.

With reference to FIG. 16, further benefit of separate data and servo readers is possible when a first, second, third, and fourth servo read signals 1440, 1448, 1456, 1464 are kept separate from a first, second, third, and fourth data read signals 1436, 1444, 1452, 1460 throughout the read channel. In other words, the multiplexing 1114 (see FIG. 13) and demultiplexing 412 (see FIG. 4) of the servo and data read signals does not take place in this embodiment.

The first through fourth servo read signals 1440, 1448, 1456, 1464 are kept separate from their respective first through fourth data read signals 1436, 1444, 1452, 1460 throughout the servo and data read circuitry. The first transducer 1404 produces the first servo read signal 1440 and the first data read signal 1436 which are each amplified in a first dual channel preamplifier 1604 to respectively produce a first amplified servo signal 1636 and a first amplified data signal 1620. If a first select input 1652 connects the first amplified data signal 1620 to a data read channel 1668 through a first multiplexer 1660, the first amplified data signal 1620 is processed to determine the data read by the first transducer 1404. Similarly, if a second select input 1656 connects the first amplified servo signal 1636 to a servo read channel 1672 through a second multiplexer 1664, the first amplified servo signal 1636 is processed to determine off-track position error from the first transducer 1404.

By manipulating the first and second select lines 1652, 1656 any of the first, second, third, or fourth servo read signals 1440, 1448, 1456, 1464 or first, second, third, or fourth data read signals 1436, 1444, 1452, 1460 can be chosen for processing by their respective servo or data read channel 1672, 1668. For example, the first servo read signal 1440 could be used to position the first through fourth transducers 1404, 1408, 1412, 1416 while the fourth transducer 1416 is used to read user data. Additionally, any one of the first through fourth transducers 1404, 1408, 1412, 1416 can be used to position the first through fourth transducers 1404, 1408, 1412, 1416 while another transducer writes user data. The separation of the data and servo read channels allows mixing and matching signals from the first through fourth transducers 1404, 1408, 1412, 1416 according to need.

Referring next to FIG. 17, a six data track segment of four different disk surfaces is shown, in straight rather than arcuate fashion, for ease of depiction. Each of the first, second, third, and fourth disk segments 1704, 1708, 1712, 1716 shows the data tracks 144 lying between a 0° and 8° slice of the disk. In this example, each disk surface has servo sectors 1516 circumferentially spaced every 8°. Further, each disk surface 108 is aligned on the spindle with a 2° offset between adjacent disk surfaces 108 so that no two disks have a servo sector 1516 the same circumferential position.

By staggering the servo sectors, the first through fourth transducers 1404, 1408, 1412, 1416 (see FIG. 16) can correct position four times more frequently. This is made possible by having separate data and servo readers 900, 904 which have separate data and servo channels (see FIG. 16). For example, while writing to the fourth segment 1716, the servo information 1516 from the first through third segments 1704, 1708, 1712 can be analyzed to provide position correction to all transducers. As an alternative to correcting position more often, the number of servo sectors 1516 could be reduced, or a compromise between less servo sectors 1516 and more positioning correction could be made.

Although the discussion of the invention has generally been limited to bias currents which flow in the same direction, other embodiments could flow the bias currents in opposite directions. For example, an advanced magnetoresistive (AMR) device with no off-axis anisotropy may allow bias currents to flow in opposite directions. Additionally, other embodiments could avoid the "hard bias" of the permanent magnets by using exchange bias or exchange pinning in combination with an AMR device.

It will be understood that the invention may be embodied in other specific forms without departing from the spirit or central characteristics thereof For example, the invention could be used with magnetic tape drives. The present examples and embodiments, therefore, are to be considered in all respects as illustrative and not restrictive, and the invention is not intended to be limited to the details given herein.

What is claimed is:

1. A magnetic storage system having one or more rotating disks, comprising:

a data track on each rotating disk;

a servo sector embedded within the data track; and a first transducer suspended above the data track, wherein the first transducer includes:
    a data reader including a first MR strip, and
    a servo reader including a second MR strip, wherein the first MR strip is electrically isolated from the second MR strip and wherein said data reader does not provide positioning information.

2. The magnetic storage system of claim 1, wherein:

the first MR strip has a first width;

the second MR strip has a second width; and the first width is less than the second width.

3. The magnetic storage system of claim 2, wherein:

the data track has a third width; and the first width of the first MR strip is less than the third width.

4. The magnetic storage system of claim 3, wherein:
the servo sector includes:
an A burst, and
a B burst; and
each of the A and B bursts has a fourth width.

5. The magnetic storage system of claim 4, further including an erase band, wherein:
the data track has a third width;
the erase band has a fifth width; and
the fourth width of the A and B bursts is greater than the fifth width plus the third width.

6. The magnetic storage system of claim 1, wherein the data reader is radially offset from the servo reader.

7. The magnetic storage system of claim 6, wherein the data and servo readers are arranged side-by-side.

8. The magnetic storage system of claim 1, wherein:
each rotating disk has a magnetic surface;
there are a plurality of servo bursts arranged along a radius on the magnetic surface; and
there are a plurality of data tracks arranged concentrically on the magnetic surface.

9. The magnetic storage system of claim 8, wherein there are more data tracks than servo bursts arranged along the radius on one side of the rotating disk.

10. The magnetic storage system of claim 1, further comprising:
a first magnetic surface; and
a second magnetic surface, wherein:
the first magnetic surface has a plurality of first servo sectors arranged along a predetermined number of first radii,
the second magnetic surface has a plurality of second servo sectors arranged along a predetermined number of second radii, and
the first radii and second radii are staggered so that the plurality of first servo sectors are circumferentially offset from the plurality of second servo sectors.

11. The magnetic storage system of claim 10, further comprising a second transducer operatively associated with the second surface, wherein:
the data track includes a data region;
the first transducer is operatively associated with the first magnetic surface; and
the first transducer performs a servo reading operation of the servo sector while the second transducer performs at least one of:
a data writing operation to the data region, and
a data reading operation from the data region.

12. The magnetic storage system of claim 1, further comprising:
a data read channel; and
a servo read channel, wherein:
the data read channel is coupled to the data reader,
the servo read channel is coupled to the servo reader, and
the data read channel is separate from the servo read channel.

13. The magnetic storage system of claim 1, wherein:
the data reader further includes:
a first conductor, and
a second conductor; and
the servo reader further includes:
a third conductor, and
a fourth conductor.

14. The magnetic storage system of claim 13, wherein at least two of the first through fourth conductors are coupled together which reduces interconnections needed by the first transducer.

15. A method for reading within a magnetic storage system comprising the steps of:
providing a first magnetic surface which includes a first data region and a first servo sector;
providing a first data reader and a first servo reader, wherein the first data reader is uncoupled from the first servo reader;
reading servo information from said first servo sector with the first servo reader;
determining an off-track position of the first data reader;
moving the first data reader to compensate for the off-track position; and
reading user data from the first data region of the first magnetic surface with the first data reader, wherein said data reader does not provide positioning information.

16. The method for reading of claim 15, further including the steps of:
providing a second magnetic surface which includes a second data region and a second servo sector; and
reading servo information from the second servo sector with a second servo reader.

17. The method for reading of claim 15, wherein the steps of reading servo information and reading user data are performed simultaneously.

18. A magnetic storage system having one or more rotating disks, comprising:
a data reader; and
a servo reader, wherein:
the data reader reads user data,
the servo reader reads servo information within embedded servo sectors,
the data reader and servo reader are separate, and
the data reader does not provide positioning information.

19. The magnetic storage system of claim 18, wherein:
the data reader includes a first MR strip;
the servo reader includes a second MR strip;
the first MR strip has a first width;
the second MR strip has a second width; and
the first width is less than the second width.

20. The magnetic storage system of claim 19, wherein:
the rotating disk includes a data track;
the data track has a third width; and
the first width of the first MR strip is less than the third width.

21. The magnetic storage system of claim 18, wherein:
the embedded servo sector includes:
an A burst, and
a B burst; and
each of the A and B bursts has a fourth width.

22. The magnetic storage system of claim 21, further including an erase band, wherein:
the rotating disk includes a data track;
the data track has a third width;
the erase band has a fifth width; and
the fourth width of the A and B bursts is greater than the fifth width plus the third width.

23. The magnetic storage system of claim 18, wherein the data reader is radially offset from the servo reader.

24. The magnetic storage system of claim 23, wherein the data and servo readers are arranged side-by-side.

25. The magnetic storage system of claim 18, wherein:
each rotating disk has a magnetic surface;
there are a plurality of servo bursts arranged along a radius on the magnetic surface; and
there are a plurality of data tracks arranged concentrically on the magnetic surface.

26. The magnetic storage system of claim 25, wherein there are more data tracks than servo bursts arranged along the radius on one side of the rotating disk.

27. The magnetic storage system of claim 18, further comprising:
a first magnetic surface; and a
second magnetic surface, wherein:
the first magnetic surface has a plurality of first servo sectors arranged along a predetermined number of first radii,
the second magnetic surface has a plurality of second servo sectors arranged along a predetermined number of second radii, and
the first radii and second radii are staggered so that the plurality of first servo sectors are circumferentially offset from the plurality of second servo sectors.

28. The magnetic storage system of claim 27, further comprising:
a data track having a data region;
a first transducer operatively associated with the first magnetic surface;
a second transducer operatively associated with the second magnetic surface, wherein the first transducer performs a servo reading operation of the servo sector while the second transducer performs at least one of:
a data writing operation to the data region, and
a data reading operation from the data region.

29. The magnetic storage system of claim 18, further comprising:
a data read channel; and
a servo read channel, wherein:
the data read channel is coupled to the data reader,
the servo read channel is coupled to the servo reader, and
the data read channel is separate from the servo read channel.

30. The magnetic storage system of claim 18, wherein:
the data reader further includes:
a first conductor, and
a second conductor; and
the servo reader further includes:
a third conductor, and
a fourth conductor.

31. The magnetic storage system of claim 30, wherein at least two of the first through fourth conductors are coupled together which reduces interconnections needed by the first transducer.

32. The magnetic storage system of claim 18, wherein:
the data reader further includes:
a first permanent magnet, and
a second permanent magnet; and
the servo reader further includes:
a third permanent magnet, and
a fourth permanent magnet.

33. The magnetic storage system of claim 32, wherein:
the first and second permanent magnets operatively engage the first MR strip to magnetically bias the first MR strip to achieve a substantially linear resistance response; and
the third and fourth permanent magnets operatively engage the second MR strip to magnetically bias the first MR strip to achieve a substantially linear resistance response.

34. The magnetic storage system of claim 31, wherein the first through fourth permanent magnets have a quiescent magnetic bias in a same direction.

35. A magnetic storage system having one or more rotating disks, comprising:
a first data track on a first data surface of the one or more rotating disks; and
a first servo sector embedded on the first data track, wherein the first servo sector is in a nonoverlapping relationship with each of the servo sectors on at least one other data surface of the one or more rotating disks, wherein a first transducer is positioned adjacent to the first data surface, wherein a second transducer positioned adjacent to a second data surface, and wherein a first reader on the first transducer flies over the first servo sector while a second reader on the second transducer flies over a data sector on the second data surface.

36. The magnetic storage system of claim 35, wherein an edge of the first servo sector is circumferentially purposefully offset relative to a corresponding edge of an adjacent servo sector of the at least one other data surface and the first data surface is magnetic.

37. The magnetic storage system of claim 35, wherein the first servo sector is circumferentially staggered relative to an adjacent second servo sector on the at least one other data surface.

38. The magnetic storage system of claim 35, further comprising:
a third data surface, wherein the first servo sector is circumferentially spaced apart from each of the servo sectors on the second and third data surfaces.

39. The magnetic storage system of claim 35, wherein the first transducer includes a data reader including a first MR strip and a servo reader including a second MR strip, wherein the first MR strip is electrically isolated from the second MR.

40. The magnetic storage system of claim 35, wherein the first servo sector is in a completely nonoverlapping relationship with each of the servo sectors on the at least one other data surface.

41. The magnetic storage system of claim 35, wherein the first servo sector is purposefully offset from each of the servo sectors on the at least one other data surface.

42. A magnetic storage system having at least one rotating disk, comprising:
a first magnetic surface that includes a plurality of first servo means for providing transducer position information, the plurality of first servo means being located on the first magnetic surface and arranged along a predetermined number of first radii;
at least a second magnetic surface that includes a plurality of second servo means for providing transducer position information, the plurality of second servo means being located on the at least a second magnetic surface and arranged along a predetermined number of second radii, wherein each of the plurality of first servo means is intentionally at least partially offset circumferentially from each of the plurality of second servo means; and,
a first transducer positioned adjacent to the first magnetic surface and a second transducer positioned adjacent to the second magnetic surface and wherein a first reader on the first transducer flies over the first servo means while a second reader on the second transducer flies over a data sector on the second magnetic surface.

43. The magnetic storage system of claim 42, wherein each of the plurality of first and second servo means include a corresponding plurality of servo sectors and wherein each of the predetermined number of first radii is located, relative to a reference plane, at an angle that is different from the angles between the predetermined number of second radii and the reference plane.

44. The magnetic storage system of claim 43, wherein the at least a second magnetic surface includes n surfaces each of which corresponds to m second servo means and the plurality of first servo means are each intentionally offset from each of the m second servo means on the n surfaces.

45. The magnetic storage system of claim 42, wherein the first transducer includes a data reader including a first MR strip and wherein the first reader is a servo reader including a second MR strip and wherein the first MR strip is electrically isolated from the second MR strip.

46. A method for manufacturing a magnetic storage system, comprising:
  writing servo information in the form of at least a first servo sector on a first data surface;
  writing servo information in the form of at least a second servo sector on a second data surface, wherein the first servo sector is purposefully offset circumferentially relative to each servo sector on the second data surface;
  positioning a first transducer adjacent to the first data surface; and
  positioning a second transducer adjacent to the second data surface, wherein, when the first transducer reads servo information, the second transducer is positioned over a data sector and, when the second transducer reads servo information, the first transducer is positioned over a data sector.

47. The method of claim 46, wherein the first and second data surfaces are located on different rotating disks and are each magnetic.

48. The method of claim 45, wherein the first transducer includes a data reader including a first MR strip and a servo reader including a second MR strip, wherein the first MR strip is electrically isolated from the second MR strip.

49. A method for performing servo control in a magnetic storage system, comprising:
  (a) reading, with a first reading element, servo information from a first servo sector on a first magnetic surface;
  (b) determining an off-track position of a second reading or writing element;
  (c) moving the second reading or writing element to compensate for the off-track position; and
  (d) reading user data from or writing user data to a second data region of a second magnetic surface with the second reading or writing element, wherein during the reading step (a) the first servo sector is purposefully circumferentially offset from a second servo sector on the second magnetic surface such that, during reading step (a), the second reading or writing element is positioned above a data region of the second magnetic surface.

50. The method of claim 49, wherein the second reading or writing element, during reading step (a), is not positioned above a servo sector of the second magnetic surface.

51. The method of claim 49, wherein the first and second magnetic surfaces are on different rotating disks and the first servo sector is not circumferentially aligned with a servo sector on the second magnetic surface.

52. The method of claim 49, wherein the first reading element and the second reading or writing element are located on different transducers.

53. The method of claim 49, wherein the first reading element is a servo reader and the second reading or writing element is a data reader and the data reader and servo reader are uncoupled from one another and located on the same transducer.

54. The method of claim 49, wherein the reading step (a) and reading or writing step (d) are performed at least substantially simultaneously.

55. A magnetic storage system having one or more rotating disks, comprising:
  a data track on each rotating disk;
  a servo sector embedded within the data track, wherein the servo sector includes an A burst and a B burst;
  a first transducer suspended above the data track, wherein the first transducer includes:
    a data reader including a first MR strip having a first width, and
    a servo reader including a second MR strip having a second width, wherein the first MR strip is electrically isolated from the second MR strip, wherein the first width is less than the second width, wherein the data track has a third width, wherein the first width of the first MR strip is less than the third width, wherein each of the A and B bursts has a fourth width; and,
  an erase band, wherein the erase band has a fifth width and wherein the fourth width of the A and B bursts is greater than the fifth width plus the third width.

56. A magnetic storage system having one or more rotating disks, comprising:
  a data reader, wherein the data reader reads user data;
  a servo reader, wherein the servo reader reads servo information within embedded servo sectors, wherein the data reader and servo reader are separate, wherein the embedded servo sectors include an A burst and a B burst, and wherein each of the A and B bursts has a fourth width; and,
  an erase band, wherein the rotating disk includes a data track having a third width, wherein the erase band has a fifth width, and wherein the fourth width of the A and B bursts is greater than the fifth width plus the third width.

57. A magnetic storage system having one or more rotating disks, comprising:
  a data track on each rotating disk;
  a servo sector embedded within the data track;
  a first transducer suspended above the data track, wherein the first transducer includes:
    a data reader including a first MR strip, and
    a servo reader including a second MR strip, wherein the first MR strip is electrically isolated from the second MR strip;
  a data read channel; and
  a servo read channel, wherein:
    the data read channel is coupled to the data reader,
    the servo read channel is coupled to the servo reader, and
    the data read channel is separate from the servo read channel.

58. A magnetic storage system having one or more rotating disks, comprising:
- a data track on each rotating disk;
- a servo sector embedded within the data track;
- a first transducer suspended above the data track, wherein the first transducer includes:
  - a data reader including a first MR strip, and
  - a servo reader including a second MR strip, wherein the first MR strip is electrically isolated from the second MR strip;
- a first magnetic surface; and
- a second magnetic surface, wherein:
  - the first magnetic surface has a plurality of first servo sectors arranged along a predetermined number of first radii,
  - the second magnetic surface has a plurality of second servo sectors arranged along a predetermined number of second radii, and
  - the first radii and second radii are staggered so that the plurality of first servo sectors are circumferentially offset from the plurality of second servo sectors.

59. The magnetic storage system of claim 58, further comprising a second transducer operatively associated with the second surface, wherein:
- the data track includes a data region;
- the first transducer is operatively associated with the first magnetic surface; and
- the first transducer performs a servo reading operation of the servo sector while the second transducer performs at least one of:
  - a data writing operation to the data region, and
  - a data reading operation from the data region.

60. A magnetic storage system having one or more rotating disks, comprising:
- a data reader;
- a servo reader, wherein:
  - the data reader reads user data,
  - the servo reader reads servo information within embedded servo sectors, and
  - the data reader and servo reader are separate;
- a first magnetic surface; and
- a second magnetic surface, wherein:
  - the first magnetic surface has a plurality of first servo sectors arranged along a predetermined number of first radii,
  - the second magnetic surface has a plurality of second servo sectors arranged along a predetermined number of second radii, and
  - the first radii and second radii are staggered so that the plurality of first servo sectors are circumferentially offset from the plurality of second servo sectors.

61. The magnetic storage system of claim 60, further comprising:
- a data track having a data region;
- a first transducer operatively associated with the first magnetic surface;
- a second transducer operatively associated with the second magnetic surface, wherein the first transducer performs a servo reading operation of the servo sector while the second transducer performs at least one of:
  - a data writing operation to the data region, and
  - a data reading operation from the data region.

* * * * *